US012802373B2

(12) United States Patent
Lee et al.

(10) Patent No.: US 12,802,373 B2
(45) Date of Patent: Nov. 17, 2026

(54) DEVICE AND METHOD FOR VIRTUAL FITTING

(71) Applicant: UIF (University Industry Foundation), Yonsei University, Seoul (KR)

(72) Inventors: In-Kwon Lee, Seoul (KR); Sang-Bin Jeon, Seoul (KR); Do Hae Lee, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 282 days.

(21) Appl. No.: 18/670,241

(22) Filed: May 21, 2024

(65) Prior Publication Data

US 2024/0394991 A1 Nov. 28, 2024

(30) Foreign Application Priority Data

May 22, 2023 (KR) ........................ 10-2023-0065430

(51) Int. Cl.
*G06T 19/20* (2011.01)
*G06Q 30/0601* (2023.01)
*G06T 15/00* (2011.01)

(52) U.S. Cl.
CPC ......... *G06T 19/20* (2013.01); *G06Q 30/0643* (2013.01); *G06T 15/00* (2013.01); *G06T 2210/16* (2013.01); *G06T 2219/2024* (2013.01)

(58) Field of Classification Search
None
See application file for complete search history.

(56) References Cited

U.S. PATENT DOCUMENTS

| | | | | |
|---|---|---|---|---|
| 11,869,163 | B1 * | 1/2024 | Liang | G06V 10/774 |
| 2016/0163103 | A1 * | 6/2016 | DeTemmerman | G06T 17/205 345/419 |
| 2023/0252747 | A1 * | 8/2023 | Meador | G06T 15/04 345/419 |

FOREIGN PATENT DOCUMENTS

| | | | |
|---|---|---|---|
| KR | 10-2021-0129874 | A | 10/2021 |
| KR | 10-2023-0021904 | A | 2/2023 |
| KR | 10-2023-0035282 | A | 3/2023 |

(Continued)

OTHER PUBLICATIONS

Fuwei Zhao et al.; "M3D-VTON: A Monocular-to-3D Virtual Try-On Network;" Proceedings of the IEEE/CVF International Conference on Computer Vision (ICCV), 2021, pp. 13239-13249 (Year: 2021).*

*Primary Examiner* — Peter Hoang

(57) ABSTRACT

A virtual fitting device includes: an artificial intelligence server which receives avatar 3D data of a user requesting virtual fitting, clothing 3D data of clothing selected by the user, and clothing material parameters for the selected clothing and generates virtual fitting 3D data through neural network operations; a rendering server which renders the virtual fitting 3D data using the virtual fitting 3D data and the clothing material parameters to generate a virtual fitting rendering image; an image transmission server which transmits pixel data of the virtual fitting rendering image to the user; and a database which stores user-specific avatar 3D data, clothing-specific 3D data, and clothing-specific clothing material parameters, wherein the clothing material parameters have a vector form including a plurality of scalar values.

14 Claims, 18 Drawing Sheets

(56) References Cited

FOREIGN PATENT DOCUMENTS

| | | | | |
|---|---|---|---|---|
| KR | 10-2530461 | B1 | 5/2023 | |
| WO | WO-2022050810 | A1 * | 3/2022 | ........... G06N 3/0464 |

* cited by examiner

FIG. 4 clothing database (610)

| clothing ID (700) | clothing 3D data (710) | clothing material parameter (720) |
| --- | --- | --- |
| 1 | $X_1$ | θ1 |
| 2 | $X_2$ | θ2 |

FIG. 5 avatar database (620)

| 800<br>user ID | 810<br>avatar 3D data |
|---|---|
| 1 | $Y_1$ |
| 2 | $Y_2$ |

(a)

(b)

DEVICE AND METHOD FOR VIRTUAL FITTING

CROSS-REFERENCE TO RELATED APPLICATIONS

This application claims priority under 35 U.S.C. § 119(a) to Korean Patent Application No. 10-2023-0065430, filed on May 22, 2023, with the Korean Intellectual Property Office, the disclosure of which is incorporated herein in its entirety by reference.

BACKGROUND

1. Technical Field

The present disclosure relates to a device and method for virtual fitting, and more particularly to a device and method for virtual fitting that shows the wearing state of clothing when purchasing clothing through an online shopping mall.

2. Description of the Related Art

A virtual fitting service is a service that shows the wearing state of clothing when purchasing clothing online. The virtual fitting service is a service that provides the information necessary to select clothing by showing the clothing selected by a user while being worn on the avatar.

In the case of the conventional virtual fitting service, the service was provided using hardware resources of the user terminal, and thus the conventional virtual fitting service was provided using 2D operations. Since user terminals such as general smartphones are not equipped with high-performance CPUs and GPUs, it was difficult to perform virtual fitting operations on 3D data and rendering for the virtual fitting operations, and accordingly, it was common to provide virtual fitting services using 2D operations.

Conventional virtual fitting services were provided through 2D operations, so most images of clothing worn were unrealistic, and since they were provided in 2D, it was difficult to receive virtual fitting images that reflected the user's body type.

In addition, the conventional virtual fitting services had a cumbersome problem from the user's perspective as the user had to use a separate virtual fitting application to virtually fit the clothing selected in a specific shopping application.

SUMMARY OF THE INVENTION

Embodiments of the present disclosure propose a device and method for virtual fitting that can provide realistic virtual fitting operations through 3D virtual fitting operations without being restricted by the user's terminal performance.

Additionally, embodiments of the present disclosure propose a device and method for virtual fitting that can reflect the user's various poses and changes in clothing using clothing material information.

In addition, embodiments of the present disclosure propose a device and method for virtual fitting that can provide a virtual fitting service directly from an online shopping application that the user is using, thereby eliminating the inconvenience of existing virtual fitting services.

According to one aspect of the present disclosure, a device for virtual fitting is provided, comprising: an artificial intelligence server which receives avatar 3D data of a user requesting virtual fitting, clothing 3D data of clothing selected by the user, and clothing material parameters for the selected clothing and generates virtual fitting 3D data through neural network operations; a rendering server which renders the virtual fitting 3D data using the virtual fitting 3D data and the clothing material parameters to generate a virtual fitting rendering image; an image transmission server which transmits pixel data of the virtual fitting rendering image to the user; and a database which stores user-specific avatar 3D data, clothing-specific 3D data, and clothing-specific clothing material parameters, wherein the clothing material parameters have a vector form including a plurality of scalar values.

The clothing material parameters may be obtained through neural network operations of a material parameter determination neural network that outputs the clothing material parameters using 3D data of the corresponding clothing.

The material parameter determination neural network may be trained by applying the clothing material parameters that receive and output the clothing 3D data of a specific clothing to a rendering engine, and reflecting a loss between the rendered image and a real image of the specific clothing.

For learning of the material parameter determination neural network, a plurality of similar labels are prepared in advance, each of the plurality of similar labels is applied to the rendering engine, the similar label with the highest similarity between the rendered image of a specific clothing and the real image of the specific clothing is selected, and then the difference between the selected similar label and the clothing material parameter that the material parameter determination neural network receives and outputs the clothing 3D data of the specific clothing is reflected as a loss, and the material parameter determination neural network is trained.

The artificial intelligence server may be trained using physics-based losses.

The physics-based losses may include strain energy loss that utilizes the physical property of clothing to maintain its original shape, and bending energy loss that utilizes the physical property of minimizing bending of the face of the clothing 3D data.

The physics-based losses may further include collision loss to ensure that clothing 3D data does not exist inside avatar data.

The virtual fitting rendering image may be displayed on the terminal of the user, and a clothing selection interface and a body selection interface may be provided for selecting a clothing or body transformation for transformation of the virtual fitting rendering image.

Request information for image transformation may be received from the user terminal, the request information for image transformation may include coordinate information for transformation of clothing or body selection information, and the artificial intelligence server and the rendering server may generate a virtual fitting transformation image using the selection information and the coordinate information for transformation.

According to another aspect of the present disclosure, a method for providing virtual fitting is provided, comprising the steps of: (a) receiving avatar 3D data of a user requesting virtual fitting, clothing 3D data of clothing selected by the user, and clothing material parameters for the selected clothing, and generating virtual fitting 3D data through neural network operations; (b) rendering the virtual fitting 3D data using the virtual fitting 3D data and the clothing material parameters to generate a virtual fitting rendering image; (c) transmitting pixel data of the virtual fitting rendering image to the user, wherein user-specific avatar 3D data, clothing-specific 3D data, and clothing-specific clothing material parameters are stored in a database, and the clothing material parameters have a vector form including a plurality of scalar values.

The device and method for virtual fitting according to embodiments of the present disclosure have the advantage of being able to provide realistic virtual fitting operations through 3D virtual fitting operations without being restricted by the user's terminal performance.

In addition, the device and method for virtual fitting according to embodiments of the present disclosure have the advantage of being able to reflect various poses of the user and changes in clothing by using material information of clothing.

In addition, the device and method for virtual fitting according to embodiments of the present disclosure have the advantage of being able to provide virtual fitting services directly from the online shopping application that the user is using, thereby eliminating the inconvenience of existing virtual fitting services.

BRIEF DESCRIPTION OF THE DRAWINGS

FIG. 4 is a diagram showing a field structure of a clothing database 610 according to an embodiment of the present disclosure.

FIG. 5 is a diagram showing a field structure of an avatar database according to an embodiment of the present disclosure.

DETAILED DESCRIPTION OF THE INVENTION

Figure 1:
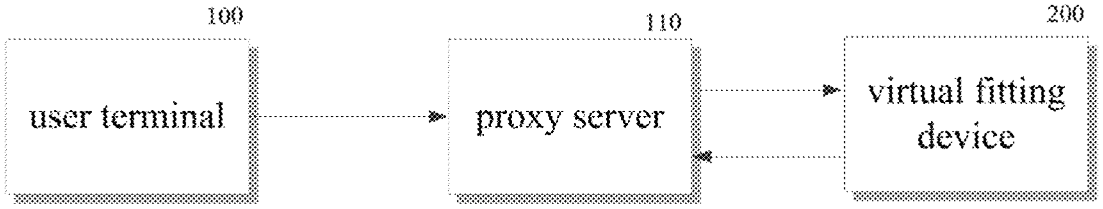
FIG. 1 is a diagram showing a schematic structure of a virtual fitting service system to which a device for virtual fitting according to an embodiment of the present disclosure is applied.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

FIG. 1 is a diagram showing a schematic structure of a virtual fitting service system to which a device for virtual fitting according to an embodiment of the present disclosure is applied.

Referring to FIG. 1, the virtual fitting system to which a device for virtual fitting according to an embodiment of the present disclosure is applied includes a user terminal 100, a proxy server 110, and a virtual fitting device 200.

The user terminal 100 is a terminal requesting a virtual fitting service, and may include various types of computing devices capable of executing applications and communication, such as a smartphone, laptop, or PC.

For example, if the user terminal 100 is a smartphone, the user terminal 100 may request a virtual fitting service using the installed application. The user terminal 100 may select clothing through the installed online shopping application and request a virtual fitting of the selected clothing.

According to a preferred embodiment of the present disclosure, the device for virtual fitting of the present disclosure can provide a virtual fitting service in the form of an App-in-App that directly provides virtual fitting results to an online shopping application used by a user through a user terminal 100 rather than providing a virtual fitting service through a separate virtual fitting application.

For example, a user using a specific online clothing shopping application requests virtual fitting for clothing selected in the application through the application, and the virtual fitting results are provided through the application. For example, it may operate in a way that the virtual fitting results are displayed in a pop-up window of the application used by the user.

The proxy server 110 provides request information or selection information from a user terminal 100 to a virtual fitting device 200, and provides a virtual fitting result (virtual fitting image) provided from the virtual fitting device 200 to the user terminal 100.

Since the user terminal 100 transmits request or selection information using various types of applications, each request or selection information may have a different data structure. The proxy server 110 converts request or selection information from various applications into information having a data structure suitable for the virtual fitting device 200 and provides it to the virtual fitting device 200.

In the case of conventional virtual fitting, operations for virtual fitting was performed using the hardware resources of the user terminal. Therefore, if the hardware of the user terminal is low-spec, there was a problem that the operation time was long and it affected the operation of other applications running on the user terminal. In particular, in order to operate the virtual fitting result as 3D data and perform rendering on it, very complex operations were required, and the problem occurred that the operations themselves were impossible with low-spec hardware.

In order to solve this problem, the virtual fitting device 200 of the present disclosure performs a 3D data virtual fitting operation and rendering operation with high complexity in the virtual fitting device 200, transmits only pixel information of an image rendered with the virtual fitting operation result to the user terminal 100, and operates such that the user terminal 100 displays only the received pixel information. Accordingly, the virtual fitting device 200 of the present disclosure enables even a low-spec user terminal 100 to provide a 3D fitting image requiring complex operation, and allows the user to check the virtual fitting image through the clothing shopping application currently in use without installing a separate application.

Meanwhile, the virtual fitting device 200 of the present disclosure can provide, even for various pose changes, virtual fitting operation results for the changed poses, regardless of the hardware performance of the user terminal 100. The 3D virtual fitting operation for the changed pose information is a substantially new 3D virtual fitting operation, and this also requires high complexity. The virtual fitting device 200 of the present disclosure also performs virtual fitting operation and rendering operation for the changed poses, and transmits only the pixel data of the image for the changed pose to the user terminal, thereby enabling even a low-spec user terminal 100 to perform virtual fitting for various poses.

Meanwhile, although FIG. 1 illustrates a structure in which a user terminal 100 communicates with a virtual fitting device 200 via a proxy server 110, it will be obvious to those skilled in the art that the user terminal 100 may also communicate directly with the virtual fitting device 200.

Figure 2:
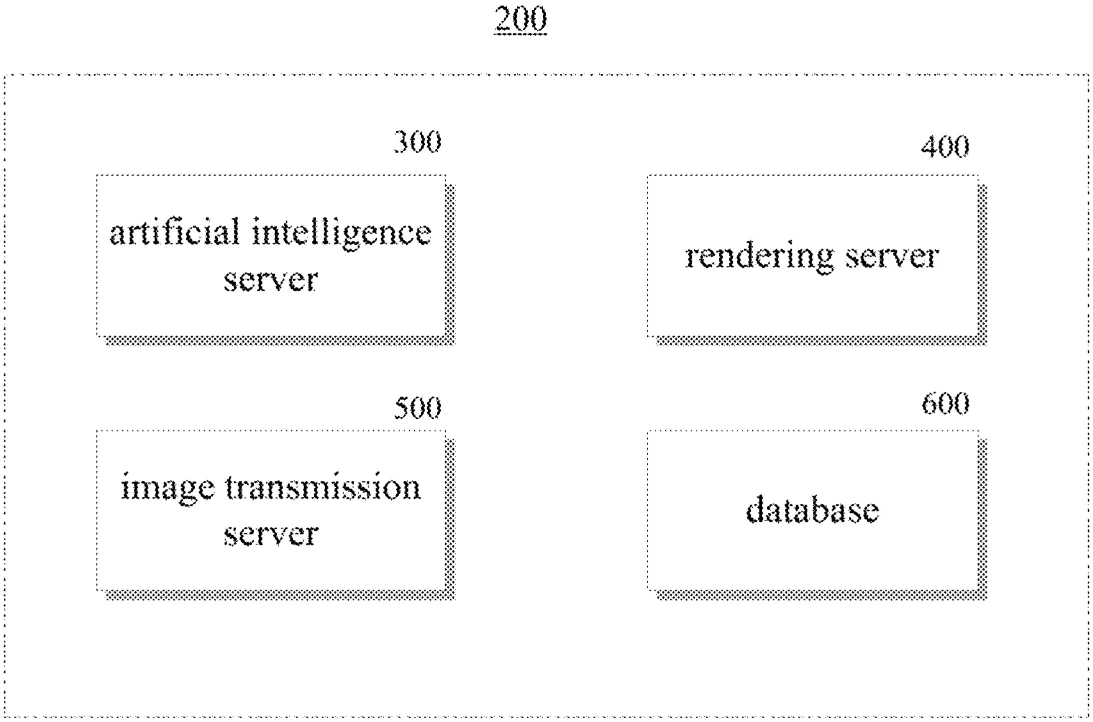
FIG. 2 is a block diagram illustrating a schematic structure of a device for virtual fitting according to an embodiment of the present disclosure.

FIG. 2 is a block diagram illustrating a schematic structure of a device for virtual fitting according to an embodiment of the present disclosure.

Referring to FIG. 2, a virtual fitting device according to an embodiment of the present disclosure includes an artificial intelligence server 300, a rendering server 400, an image transmission server 500, and a database 600.

The artificial intelligence server 300 performs virtual fitting operations required for virtual fitting. Various neural network models may be included for virtual fitting operations in the artificial intelligence server 300.

The artificial intelligence server 300 performs a virtual fitting operation through a neural network operation of a pre-trained artificial neural network using the clothing information selected by the user and an avatar corresponding to the user's body information. Here, the virtual fitting operation is an operation that generates 3D data on the result of fitting the clothing selected by the user to the avatar corresponding to the user's body information.

According to a preferred embodiment of the present disclosure, the artificial intelligence server 300 performs a virtual fitting operation by reflecting the material parameters of the clothing selected by the user. Depending on the material of the clothing, the texture of the 3D data when the clothing is worn may vary. The artificial intelligence server 300 of the present disclosure receives material parameters along with clothing selected by the user and the user's avatar and performs a virtual fitting operation. The method for obtaining material parameters and the data structure of the material parameters will be described with reference to a separate drawing.

Figure 3:
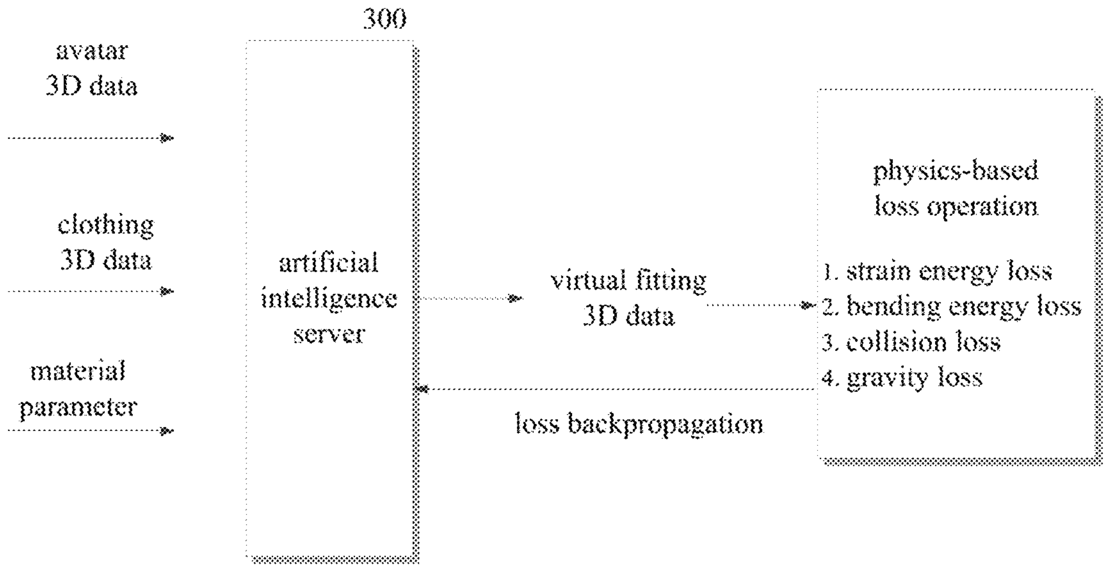
FIG. 3 is a diagram showing a learning structure of an artificial intelligence server 300 according to an embodiment of the present disclosure.

FIG. 3 is a diagram showing a learning structure of an artificial intelligence server 300 according to an embodiment of the present disclosure.

Referring to FIG. 3, 3D data of clothing, 3D data of avatar, and material parameters are input to the artificial intelligence server 300 of the present disclosure for learning. The artificial intelligence server 300 performs neural network operations using the above input information to output 3D data that virtually fits the selected clothing, but it is difficult to prepare labels for the virtual fitting results in advance and use them for learning. This is because the virtual fitting results differ depending on the user's body type, so it is difficult to prepare labels for various clothing and avatars of various body types in advance.

Accordingly, the artificial intelligence server 300 of the present disclosure learns using physics-based losses. According to an embodiment of the present disclosure, learning may be performed by applying strain energy loss, bending energy loss, collision loss, and gravity loss.

Figure 15:
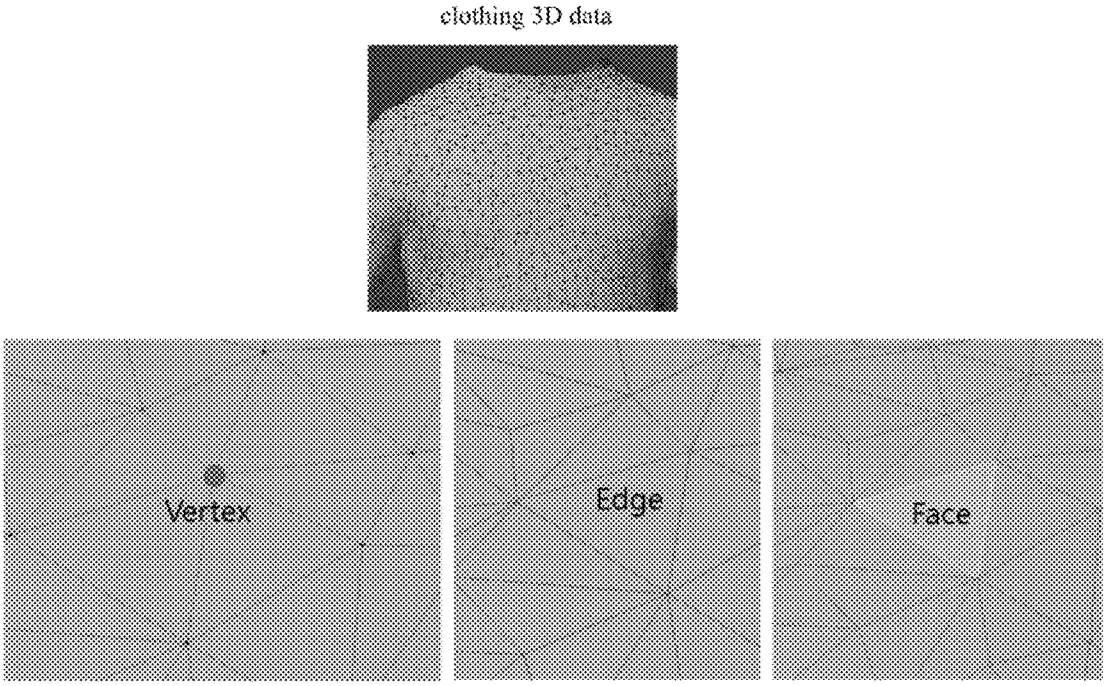
FIG. 15 is a diagram illustrating vertices, edges, and faces in clothing 3D data according to an embodiment of the present disclosure.

The 3D data of clothing consists of vertices, edges, and faces. FIG. 15 is a diagram illustrating vertices, edges, and faces in clothing 3D data according to an embodiment of the present disclosure.

Clothing can stretch or shrink, but it has the characteristic of trying to maintain its original shape as much as possible. Strain energy loss reflects this characteristic and provides a loss for learning of the artificial intelligence server 300.

Figure 16:
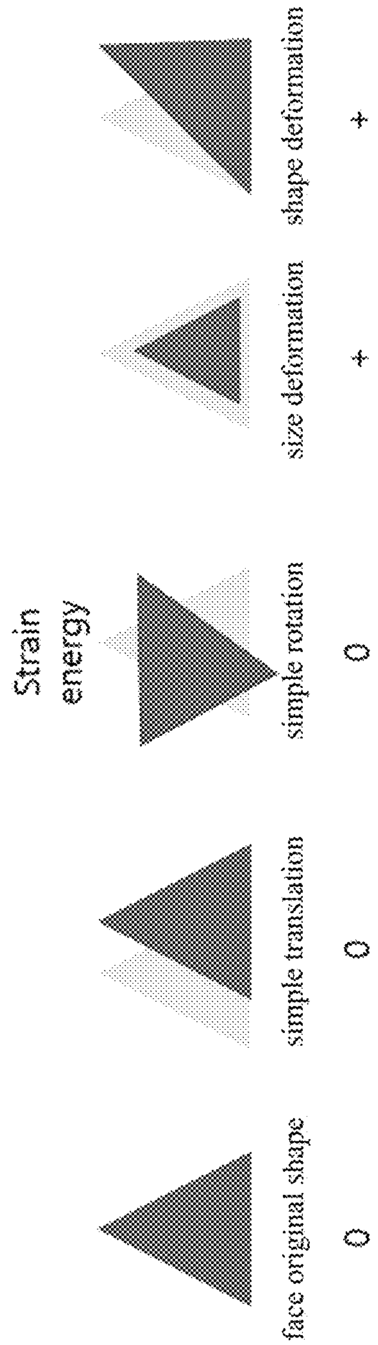
FIG. 16 is a diagram for explaining strain energy loss according to an embodiment of the present disclosure.

FIG. 16 is a diagram for explaining strain energy loss according to an embodiment of the present disclosure.

Referring to FIG. 16, an operation of generating a loss according to the shape of the face in the virtual fitting 3D data output from the artificial intelligence server 300 is illustrated. As illustrated in FIG. 15, if the original shape of the face of the clothing is maintained, simply moved, or simply rotated in the virtual fitting 3D data, no loss occurs. However, if the size or shape of the face is deformed, a loss corresponding to the degree of deformation is generated, and the generated loss is back-propagated to the artificial intelligence server 300 so that the artificial intelligence server 300 learns.

Figure 17:
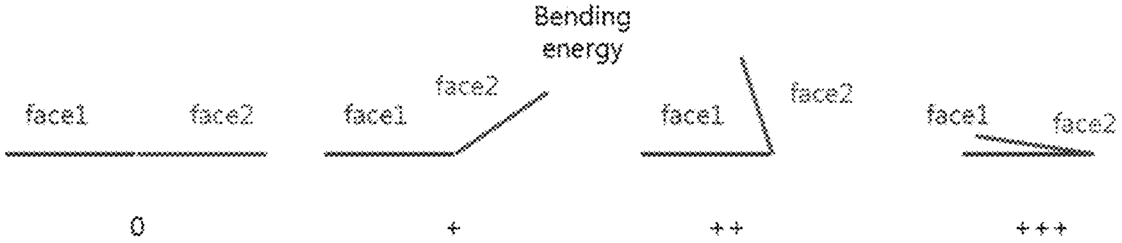
FIG. 17 is a diagram for explaining bending energy loss according to an embodiment of the present disclosure.

FIG. 17 is a diagram for explaining bending energy loss according to an embodiment of the present disclosure.

Clothes have the characteristic of trying to maintain a non-bending state as much as possible, and the bending energy loss is generated based on the connection state of the faces of the clothes. Referring to FIG. 16, if two faces connected to each other are connected without bending each other, no loss occurs. However, if two faces connected to each other are bent, a loss proportional to the bending angle is generated and back-propagated to the artificial intelligence server 300.

Figure 18:
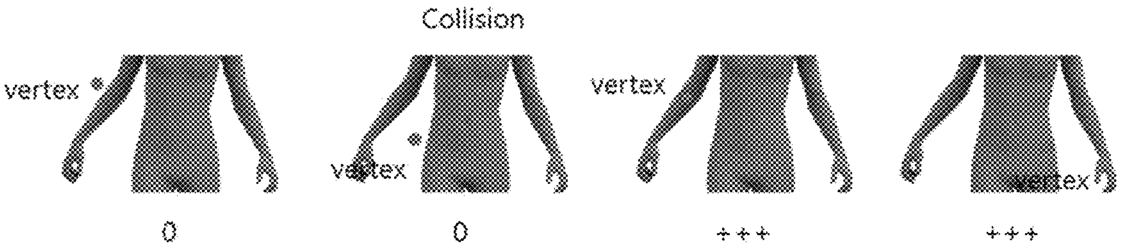
FIG. 18 is a diagram for explaining collision loss according to an embodiment of the present disclosure.

FIG. 18 is a diagram for explaining collision loss according to an embodiment of the present disclosure.

The collision loss is a loss to prevent the clothing 3D data from being located within the avatar 3D data in the virtual fitting 3D data.

Referring to FIG. 18, if the vertex of the clothing 3D data exists outside the body, no collision loss occurs. However, if the vertex of the clothing 3D data is located within the avatar 3D data, a loss occurs, and the loss that occurs is back-propagated to the artificial intelligence server 300 to perform learning.

Meanwhile, the gravity loss occurs when the height coordinates of the vertices of the clothing 3D data do not reflect gravity. If the coordinates of the vertices of the clothing 3D data do not come into contact with the body from above and below, it violates the law of gravity, so in this case, gravity loss occurs and is back-propagated to the artificial intelligence server 300, so that learning of the artificial intelligence server 300 takes place.

The rendering server 400 has a function of transforming the virtual fitting 3D data, which is the operation result of the artificial intelligence server 300, into a 2D image. The 3D data is data composed of coordinates of x, y, and z, and the rendering server 400 converts the 3D data into a 2D image so that the virtual fitting result can be provided in the form of an image on the user terminal. Rendering is greatly affected by hardware performance such as CPU and GPU, and high-performance CPU and GPU are required to process a large amount of 3D data, so the virtual fitting device 200 of the present disclosure functions as a kind of cloud computing device.

The image transmission server 500 transmits an image of the virtual fitting result generated by the rendering server 400 to the user terminal 100 or proxy server 110. The image transmission server 500 transmits only pixel values of the 2D image, and the user terminal 100 can show the virtual fitting result to the user in the same manner as a general streaming service.

The database 600 can be divided into a clothing database 610 and an avatar database 620. The information stored in the database 600 is used as input information for performing a virtual fitting operation in the artificial intelligence server 300.

FIG. 4 is a diagram showing a field structure of a clothing database 610 according to an embodiment of the present disclosure.

Referring to FIG. 4, the clothing database 610 may have a clothing ID field 700, a clothing 3D data field 710, and a clothing material parameter field 720.

The clothing ID field 700 stores ID information of each clothing. The clothing ID is an identifier for distinguishing clothing, and when a user requests virtual fitting of a specific clothing, the ID information of the clothing is transmitted to the virtual fitting device 200.

The clothing 3D data field 710 stores 3D data for each clothing. The 3D data for each clothing is acquired in advance and stored in the clothing 3D data field 710. The clothing 3D data may be generated using images taken of the clothing from various angles. A specific method for acquiring 3D data for clothing will be described with reference to a separate drawing.

The clothing material parameter field 720 stores the material parameter of the clothing. The clothing material parameter is a parameter set to perform rendering and virtual fitting by reflecting the material of the clothing. According to an embodiment of the present disclosure, the clothing material parameter may have a vector structure consisting of a plurality of numbers. For example, the clothing material parameter may have a vector form including a plurality of scalar values, such as $\{\theta_1, \theta_2, \theta_3, \ldots \theta_N\}$. Each θ constituting the parameter can be defined as attribute information reflecting the material. For example, $\theta_1$ can be a value representing the "specular" attribute among materials, and $\theta_2$ can be a value representing the "metalness" attribute. In this way, clothing material parameters represent clothing materials as vectors for multiple attributes, and a method for obtaining clothing material parameters will be described with reference to a separate drawing.

The material of clothing is wool, cotton, silk, cashmere, etc., but this information is text information and cannot be directly reflected in rendering and neural network operations. In addition, when acquiring 3D data on clothing, it is not easy to separately acquire the material of the clothing because only the photograph information of the clothing is acquired. Therefore, the present disclosure defines material parameters as a set of information representing the properties of the material.

As described above, the 3D data and material parameters of the clothing are input to the artificial intelligence server 300 and serve as input data for virtual fitting neural network operations.

FIG. 5 is a diagram showing a field structure of an avatar database according to an embodiment of the present disclosure.

Referring to FIG. 5, the avatar database according to an embodiment of the present disclosure includes a user ID field 800 and an avatar 3D data field 810. The user ID field 800 stores ID information of each user. The user ID is an identifier uniquely assigned to each user.

The avatar 3D data is 3D data created based on user body information provided by the user. The user body information may include various information related to the user and body, such as the user's height, weight, and age.

There are various known methods that can be used to generate avatar 3D data using the user's body information. For example, the 3D data can be generated through neural network operations, but it is not limited to this.

The user's avatar 3D data is input as input data to the artificial intelligence server for virtual fitting. If a new user requests virtual fitting, the virtual fitting device of the present disclosure receives body information from the user, creates avatar 3D data, stores it in the avatar database 620, and then provides the avatar 3D data to the artificial intelligence server 300.

Figure 6:
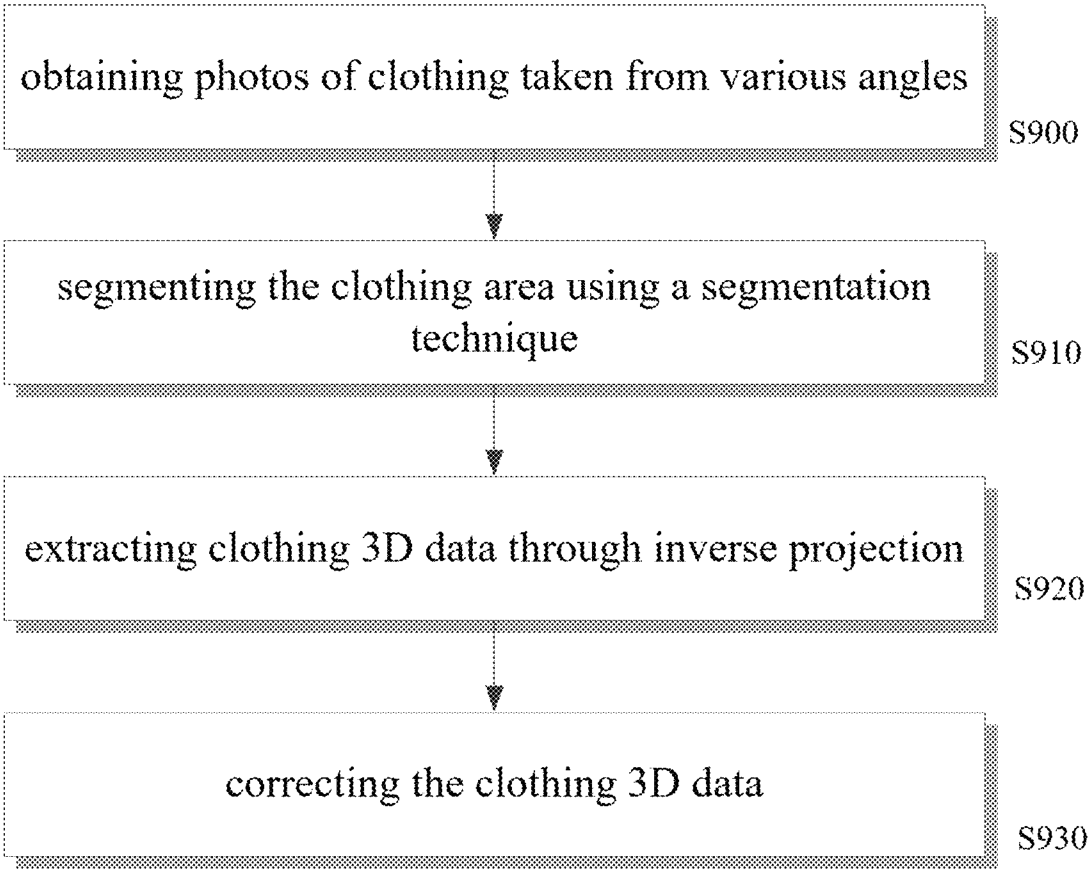
FIG. 6 is a diagram showing a method for obtaining clothing 3D data according to an embodiment of the present disclosure.

FIG. 6 is a diagram showing a method for obtaining clothing 3D data according to an embodiment of the present disclosure.

As described above, the clothing 3D data is stored in the clothing database 610 and serves as input data for the artificial intelligence server.

In order to obtain 3D data of clothing, first, photos of clothing taken from various angles are obtained S900. It is desirable that the photos of clothing be photos of the clothing being worn. Since the shape of clothing when worn on a human body is different from the shape when not worn, it is desirable to obtain photos of clothing while wearing the target clothing using a mannequin or model. In addition, it is desirable to obtain dozens or more photos from different angles in order to obtain accurate 3D data.

When a plurality of clothing photos taken from different angles are acquired, the clothing area is segmented for each photo using a segmentation technique S910. Since clothing photos are acquired while the clothing is being worn by a mannequin or model, the clothing photos include the mannequin and the background. In order to acquire only 3D data for the clothing, the mannequin (or model) and the background need to be removed, so only the clothing area is segmented using a segmentation technique. Since the segmentation technique that segments only a specific object is a widely known technology, a detailed description thereof is omitted. Segmentation may be performed using an image analysis algorithm, or segmentation may be performed using an object recognition neural network.

3D data is initially generated using photographs acquired from various angles, and only 3D data corresponding to clothing is extracted from the initially generated 3D data through inverse projection on the segmentation result S920.

Figure 7:
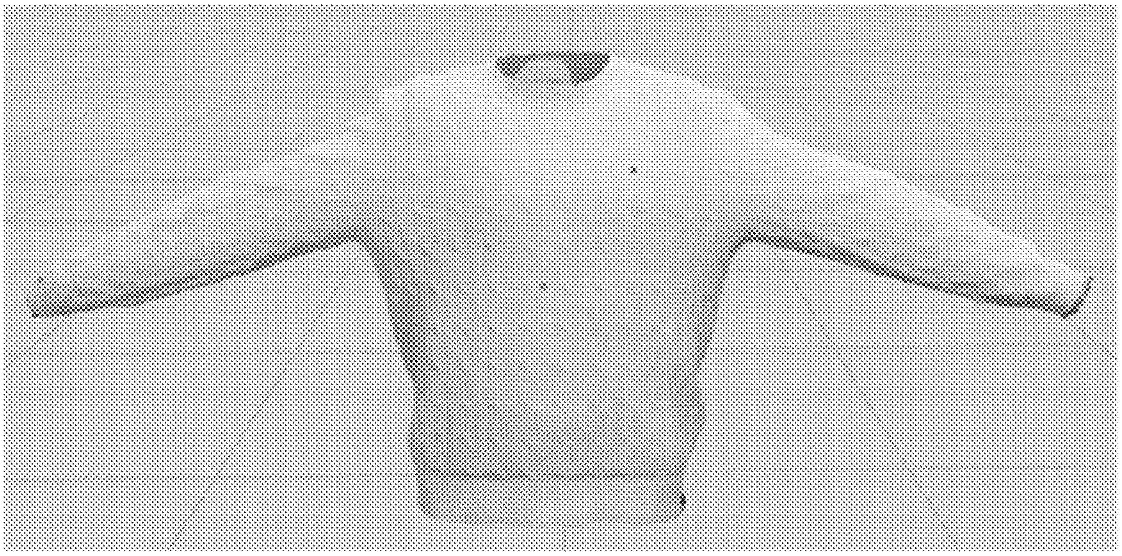
FIG. 7 is a diagram showing an example of rendering clothing 3D data obtained according to the method illustrated in FIG. 6.

FIG. 7 is a diagram showing an example of rendering clothing 3D data obtained according to the method illustrated in FIG. 6.

As shown in FIG. 7, the clothing 3D data has a shape in a worn state, and the background and the wearing mannequin (or model) are removed.

Figure 8:
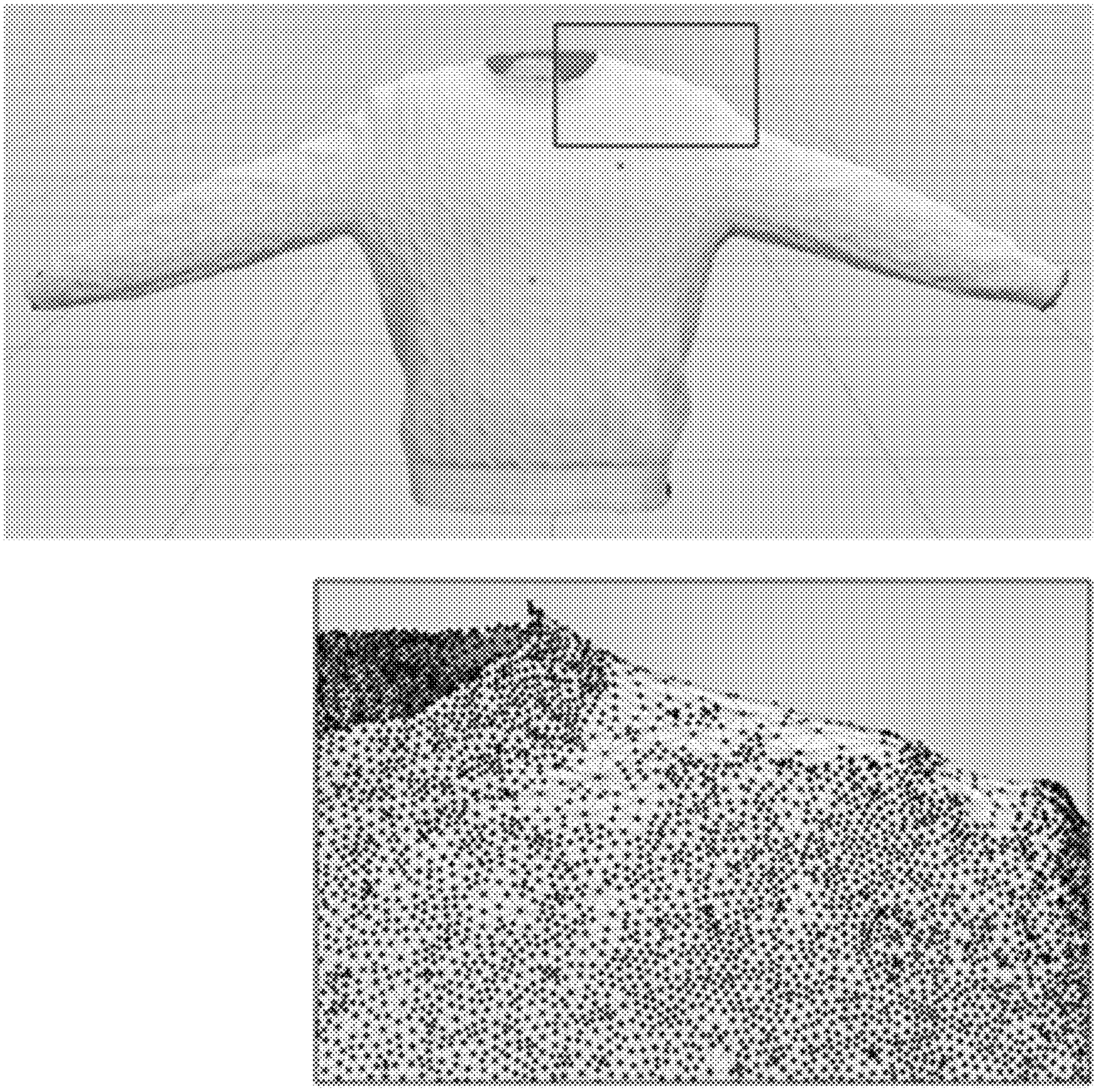
FIG. 8 is a diagram showing a specific area enlarged from the rendered 3D data of FIG. 7.

FIG. 8 is a diagram showing a specific area enlarged from the rendered 3D data of FIG. 7.

Referring to FIG. 8, 3D data acquired through multiple photographs often have a large number of vertices and a disorganized topology (the shape of a specific face in 3D). Such clothing 3D data may not be suitable for direct application to virtual fitting.

Accordingly, additional correction work is performed on the acquired 3D data S930. Various correction techniques such as hole filling, topology reconstruction (Retopology), and decimation may be used for correction of 3D data, and since these correction techniques are already known methods, detailed descriptions thereof will be omitted.

Figure 9:
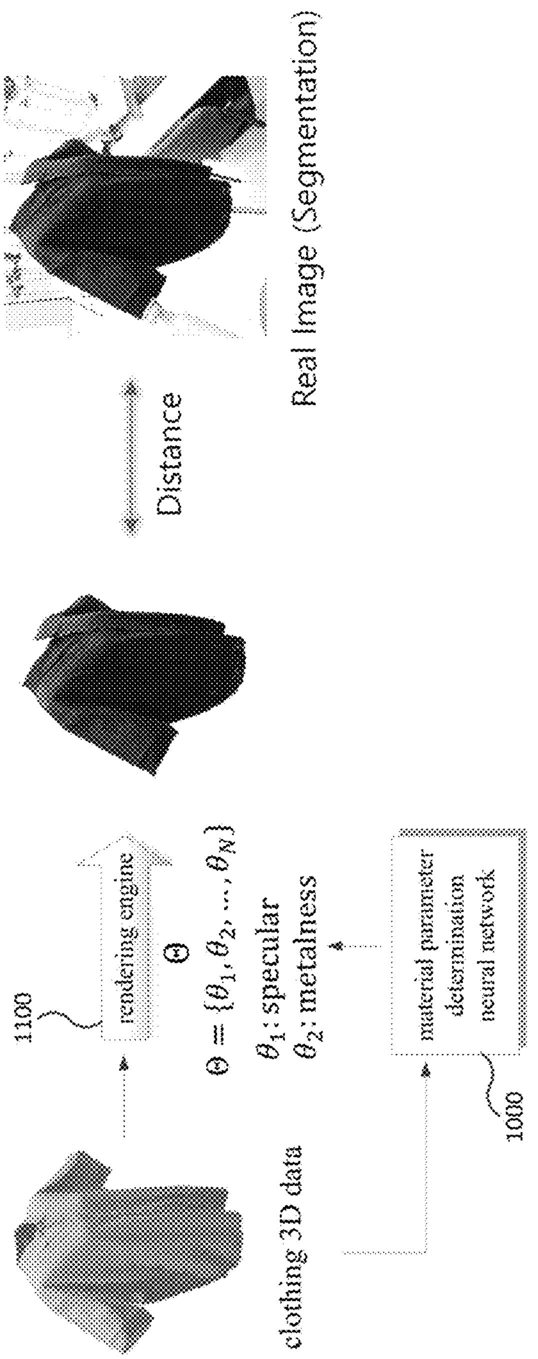
FIG. 9 is a diagram showing a method of training a material parameter determination neural network according to an embodiment of the present disclosure.

FIG. 9 is a diagram showing a method of training a material parameter determination neural network according to an embodiment of the present disclosure.

According to the present disclosure, clothing material parameters are obtained through neural network operations. As described above, clothing material parameters have a vector structure, and the material parameters are applied to rendering and virtual fitting.

Referring to FIG. 9, in order to obtain the clothing material parameters, clothing 3D data, a material parameter determination neural network 1000, a rendering engine (1100, the rendering engine is a device that has the same function as the rendering server, but is used in the learning stage of the neural network for obtaining clothing material parameters, and therefore a different name is used) and a clothing photo corresponding to the clothing 3D data are prepared in advance.

The material parameter determination neural network 1000 outputs the clothing material parameters through learning, and other elements are used for learning of the material parameter determination neural network 1000.

The clothing 3D data is input into the material parameter determination neural network 1000, and the clothing material parameter determination neural network 1000 outputs clothing material parameters through neural network operations.

If it has been properly inferred through the material parameter determination neural network 1000, the 2D image rendered by the rendering engine 1100 by applying the output clothing material parameter will be similar to the prepared clothing photo, and one learning method can be to learn the clothing material parameter neural network 1000 by using the difference between the prepared clothing photo and the 2D image rendered by the rendering engine by applying the clothing material parameter output from the material parameter neural network 1000 as a loss.

Figure 10:
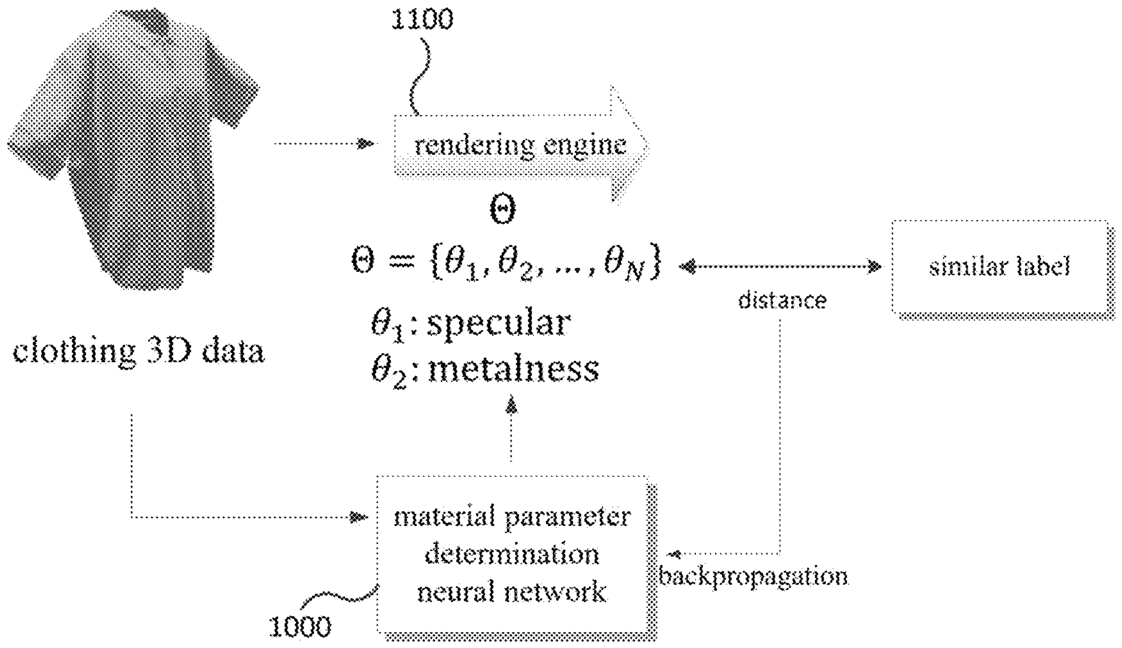
FIG. 10 is a diagram showing another method for training a clothing material parameter determination neural network according to an embodiment of the present disclosure.

FIG. 10 is a diagram showing another method for training a clothing material parameter determination neural network according to an embodiment of the present disclosure.

The learning method described with reference to FIG. 9 may be difficult to backpropagate the loss. The clothing material parameters themselves are vectors made up of real numbers, which are not easy to differentiate, and require other processing to make them differentiable.

In the present disclosure, a method of preparing similar labels in advance for easier learning of the clothing material parameter determination neural network is proposed. For example, similar labels for N preset clothing material parameters are prepared in advance as shown in FIG. 10.

The most appropriate similar label among N similar labels prepared in advance is selected using a rendering engine. The rendering engine 1100 generates a plurality of 2D images by applying the clothing material parameters of each similar label. Specifically, the rendering engine 1100 receives clothing 3D data, applies the clothing material parameters of the selected similar labels, renders 2D images for the clothing 3D data, and generates 2D image data.

The 2D image for each similar label generated by the rendering engine 1100 is compared with an actual photograph corresponding to the prepared 3D clothing data, and a similar label applied to the most similar 2D image is selected.

For the learning of the material parameter determination neural network 1000, the material parameter determination neural network 1000 is trained by using the difference between the similar label selected through the above process and the clothing material parameter output from the clothing material parameter determination neural network 1000 as a loss. Various types of neural networks such as CNN, GNN, and DNN may be used as the material parameter determination neural network 1000. The above loss is backpropagated to the material parameter neural network 1000, and learning is performed while weights of the material parameter neural network 1000 are updated in the direction that minimizes the loss gradient.

When the learning of the material parameter determination neural network 1000 is completed, the material parameter determination neural network 1000 functions as a device that receives 3D data of clothing and outputs the material parameters of the clothing. The clothing material parameters for each clothing output from the clothing material parameter determination neural network 1000 are stored in the clothing material parameter field 720 of the clothing database 610.

Figure 11:
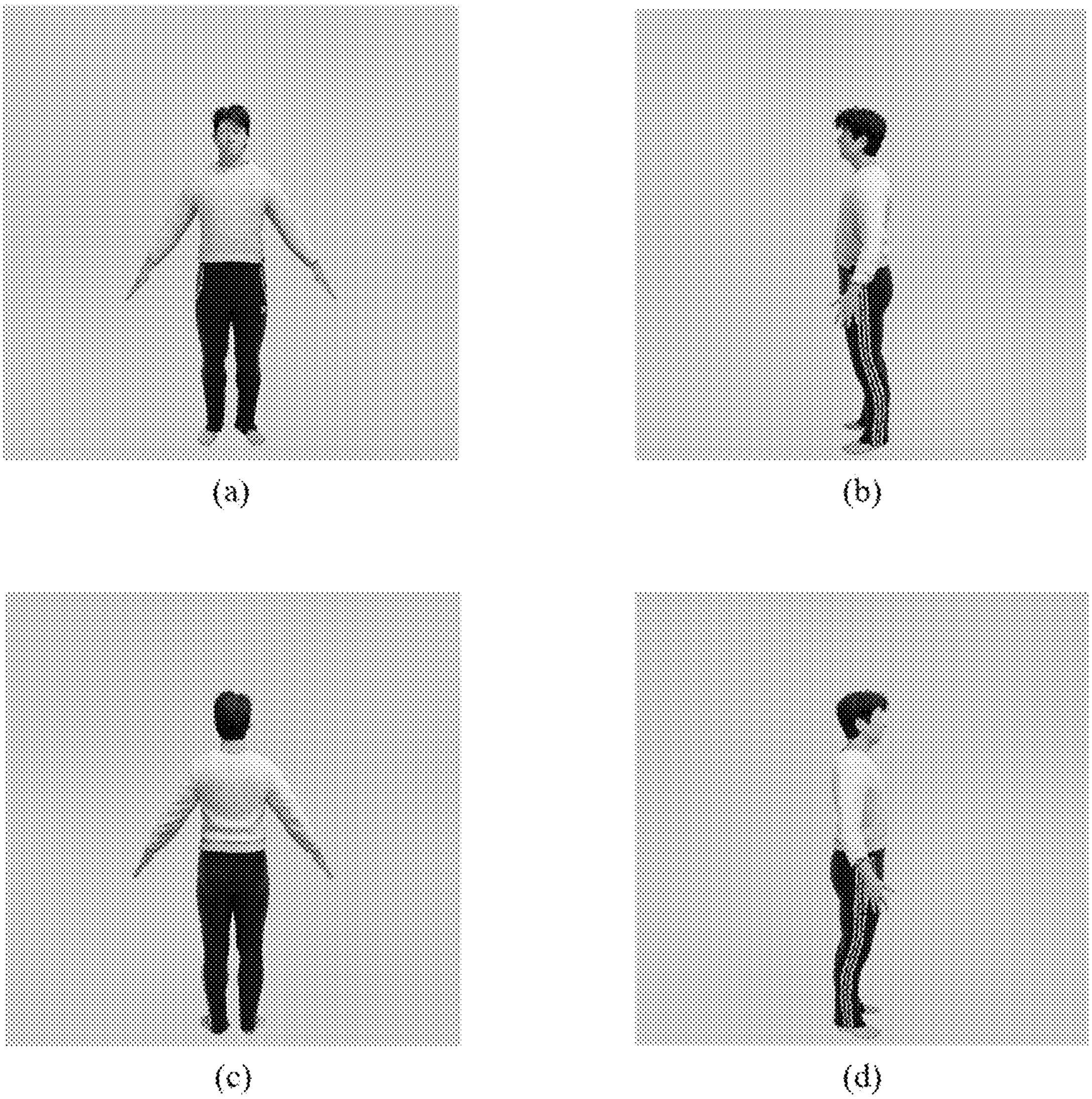
FIG. 11 is a diagram showing a result of performing virtual fitting according to an embodiment of the present disclosure.

FIG. 11 is a diagram showing a result of performing virtual fitting according to an embodiment of the present disclosure.

Referring to FIG. 11, the result of rendering 3D data output from the artificial intelligence server 300 by the rendering server 400 is illustrated. FIG. 11 illustrates four rendering images viewed from different angles.

Since the present disclosure basically provides a virtual fitting image based on 3D data, it is possible to provide virtual fitting images from various angles, and compared to existing virtual fittings that only provide a 2D image viewed from the front, the virtual fitting device of the present disclosure can provide more useful information when selecting clothing because it can provide virtual fitting from various angles.

Figure 12:
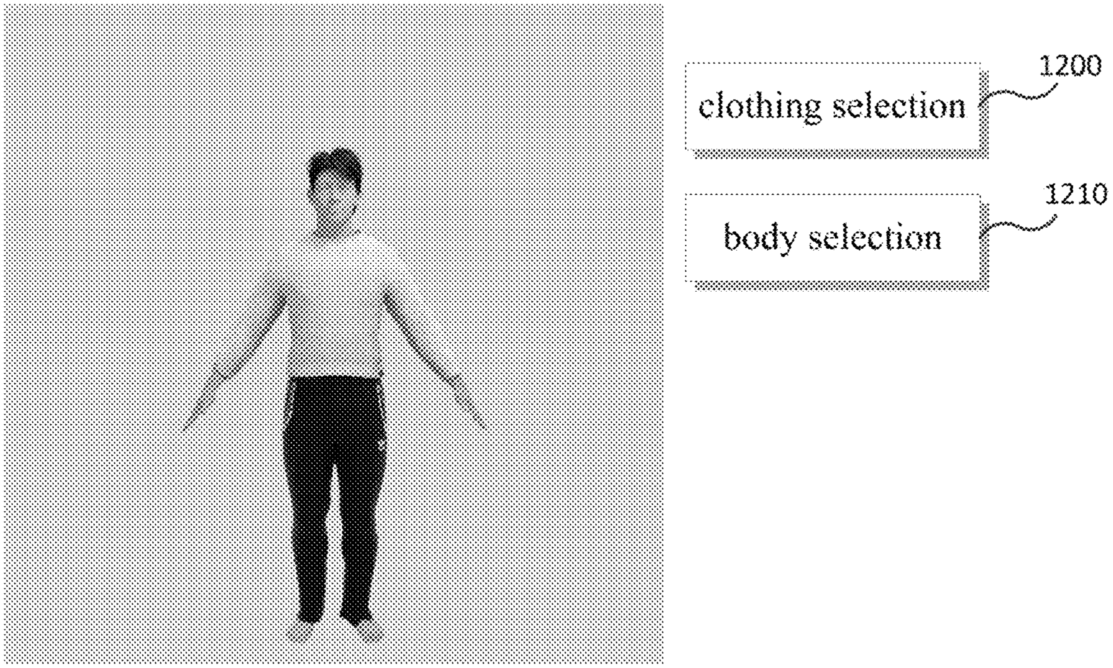
FIG. 12 is a diagram showing a user interface for fitting image transformation during virtual fitting according to an embodiment of the present disclosure.

FIG. 12 is a diagram showing a user interface for fitting image transformation during virtual fitting according to an embodiment of the present disclosure.

Referring to FIG. 12, a clothing selection interface 1200 and a body selection interface 1210 are provided as user interfaces for converting a virtual fitting image of the present disclosure. Converting a fitting image means converting a virtual fitting image into a pose desired by the user after the virtual fitting image is provided to the user in a basic pose.

The present disclosure provides a body selection interface 1210 for selecting a user's body and converting an image, as well as a clothing selection interface 1200 for converting clothing.

According to an embodiment of the present disclosure, after selecting a specific part of a human body or clothing, the selected point is moved to a specific area to provide a virtual fitting image in which the body or clothing is transformed. Since the clothing and the body overlap each other in the virtual fitting image provided to the user, it may not be clear whether the point selected by the user for transformation is the clothing or the body. Accordingly, the present disclosure provides a clothing selection interface 1200 and a body selection interface 1210, and the user performs transformation of the virtual fitting image after selecting one of them.

Figure 13:
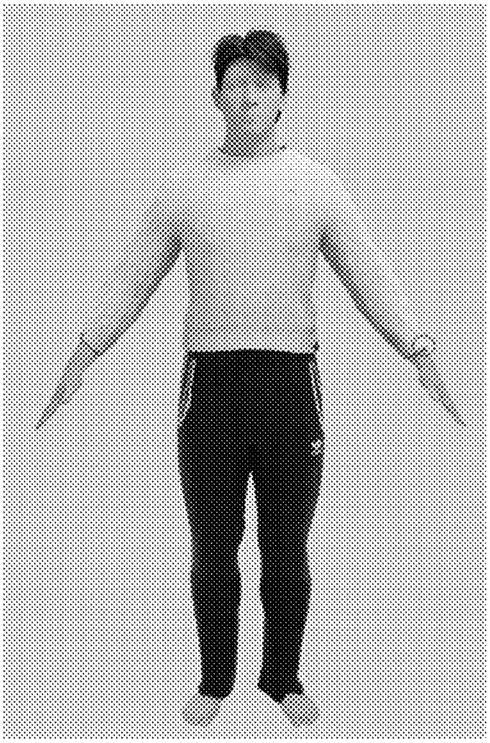
FIG. 13 is a diagram showing an example of changing clothing in a virtual fitting image according to an embodiment of the present disclosure.
Figure 13:
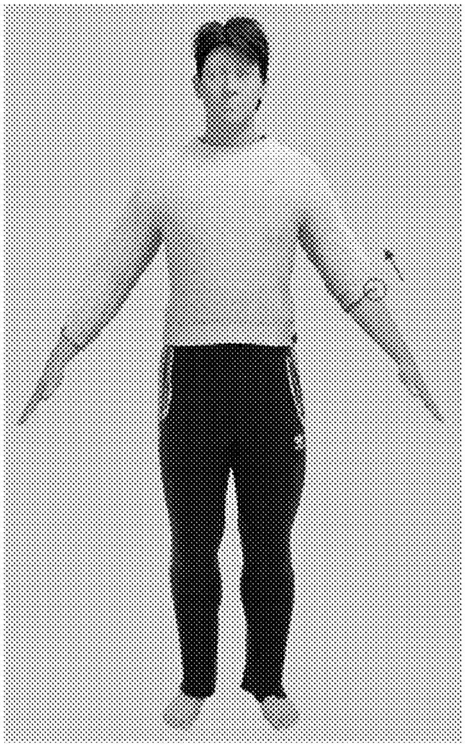

FIG. 13 is a diagram showing an example of changing clothing in a virtual fitting image according to an embodiment of the present disclosure.

The user can request the virtual fitting device 200 to transform the clothing after selecting the clothing selection interface 1200 in the interface of FIG. 12. Referring to FIG. 11(*a*), the user specifies a specific point of the clothing. Also, referring to FIG. 11(*b*), the user specifies a point to be transformed after specifying the point. For example, if the device used by the user is a mouse, the user can request a change in the clothing in the form of a drag and drop. If a touch panel is used as the interface, the user can request a change in the clothing in the form of a touch and drag.

The user's clothing transformation request information (selected coordinates and last coordinates) is provided to the virtual fitting device 200, and the artificial intelligence server of the virtual fitting device 200 generates a virtual fitting transformation image reflecting the clothing transformation request information. When generating a virtual fitting transformation image, the material parameters acquired and stored in advance are reflected and rendering is performed on the rendering server. In this way, since a transformation image reflecting the clothing material is created, the user can check the change in clothing similar to the actual fitting.

Figure 14:
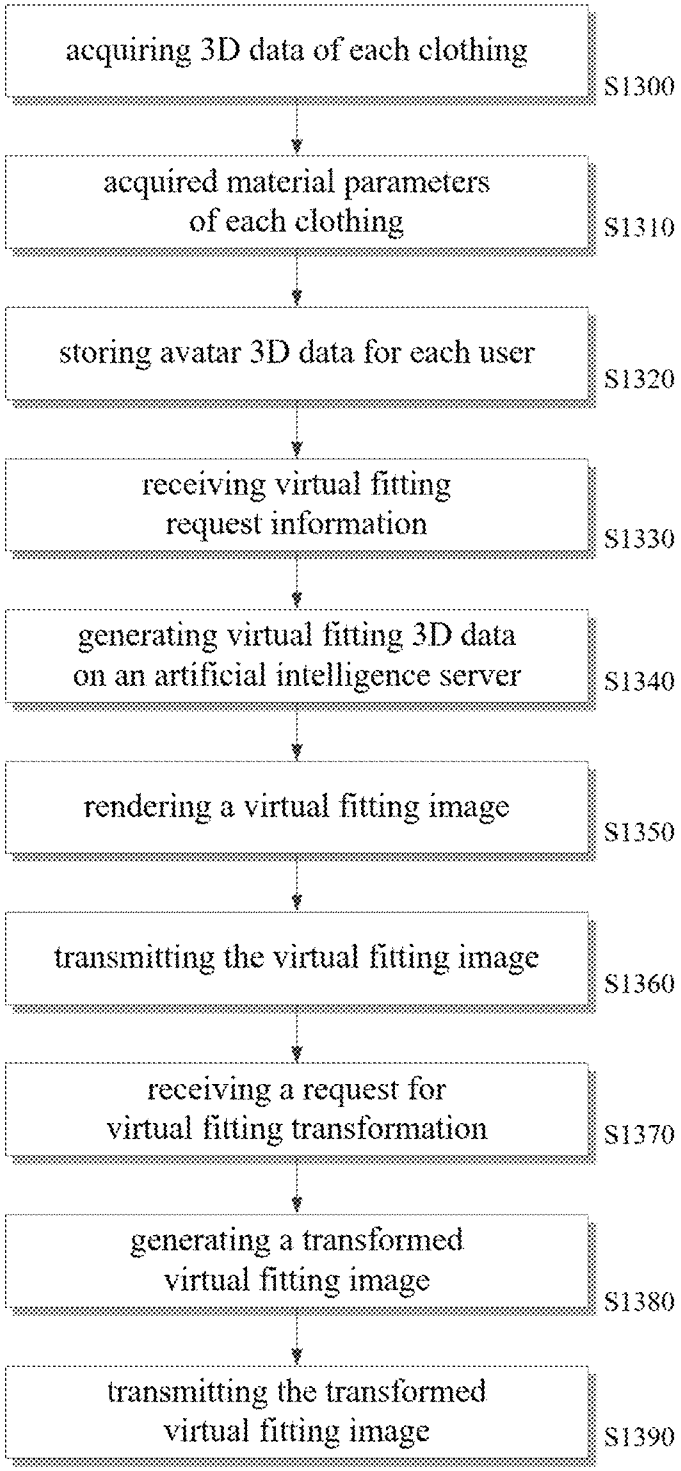
FIG. 14 is a flowchart showing the overall flow of a method for providing virtual fitting according to an embodiment of the present disclosure.

FIG. 14 is a flowchart showing the overall flow of a method for providing virtual fitting according to an embodiment of the present disclosure.

Referring to FIG. 14, first, 3D data of each clothing is acquired (step S1300). As described above, 3D data of clothing can be acquired using clothing photos taken from various angles, and an artificial neural network can be used to acquire the 3D data of clothing.

The acquired clothing 3D data is corrected, and the corrected clothing 3D data is stored in the clothing database 610.

In addition, the material parameters of the clothing are acquired using the acquired clothing 3D data, and the acquired material parameters are also stored in the clothing database 610 (step S1310). As described above, the material parameters are acquired through the rendering engine and the artificial neural network. The artificial neural network for acquiring the material parameters is trained in advance, and the learning of the artificial neural network for acquiring the material parameters is described above.

In addition, avatar 3D data for each user is stored (step S1320). If the user who requested virtual fitting is not stored in the avatar database 620, the user's body information is provided, and avatar 3D data corresponding to the user is acquired and stored in the avatar database.

Virtual fitting request information for clothing selected from the user terminal (or proxy server) is received (step S1330). The virtual fitting request information includes clothing ID information and user ID information.

The artificial intelligence server 300 of the virtual fitting device 200 generates virtual fitting 3D data of clothing worn by the user's avatar (step S1340).

The rendering server 400 of the virtual fitting device 200 renders a virtual fitting image by applying material parameters stored in advance in the clothing database 610 (step S1350).

The rendered virtual fitting image is transmitted to the user terminal (or proxy server) through the image transmission server 500 (step S1360). 3D data generation and rendering for virtual fitting are both performed in the virtual fitting device, and only the pixel data of the rendered 2D image is transmitted to the user terminal.

When a request for transformation of a virtual fitting image (transformation target (clothing or body), initial selection coordinates, final selection coordinates) is received from a user (step S1370), the artificial intelligence server 300 generates new 3D data using the initial coordinates and the final selection coordinates, and the rendering server 400 generates a transformed virtual fitting image using the new 3D data and clothing material parameters (step S1380).

The transformed virtual fitting image is transmitted to the user terminal (or proxy server) through the image transmission server 500 (step S1390).

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A device for virtual fitting, comprising:

an artificial intelligence server which receives avatar 3D data of a user requesting virtual fitting, clothing 3D data of clothing selected by the user, and clothing material parameters for the selected clothing and generates virtual fitting 3D data through neural network operations;

a rendering server which renders the virtual fitting 3D data using the virtual fitting 3D data and the clothing material parameters to generate a virtual fitting rendering image;

an image transmission server which transmits pixel data of the virtual fitting rendering image to the user; and a database which stores user-specific avatar 3D data, clothing-specific 3D data, and clothing-specific clothing material parameters, wherein the clothing material parameters have a vector form including a plurality of scalar values, wherein the clothing material parameters are obtained through neural network operations of a material parameter determination neural network that outputs the clothing material parameters using 3D data of the corresponding clothing, and wherein, for learning of the material parameter determination neural network, a plurality of similar labels are prepared in advance, each of the plurality of similar labels is applied to a rendering engine to generate a rendered image of a specific clothing, the similar label with the highest similarity between the rendered image and a real image of the specific clothing is selected, and then a difference between the selected similar label and the clothing material parameters that the material parameter determination neural network outputs in response to receiving the clothing 3D data of the specific clothing is reflected as a loss, so that the material parameter determination neural network is trained.

2. The device for virtual fitting according to claim 1, wherein the material parameter determination neural network is trained by applying, to the rendering engine, the clothing material parameters that the material parameter determination neural network outputs in response to receiving the clothing 3D data of the specific clothing, and reflecting a loss between an image rendered by the rendering engine in response to the applied clothing material parameters and the real image of the specific clothing.

3. The device for virtual fitting according to claim 1, wherein the artificial intelligence server is trained using physics-based losses.

4. The device for virtual fitting according to claim 3, wherein the physics-based losses include strain energy loss that utilizes a physical property of clothing to maintain its original shape, and bending energy loss that utilizes the physical property of minimizing bending of a face of the clothing 3D data.

5. The device for virtual fitting according to claim 4, wherein the physics-based losses further include collision loss to ensure that clothing 3D data does not exist inside avatar data.

6. The device for virtual fitting according to claim 1, wherein the virtual fitting rendering image is displayed on a terminal of the user, and a clothing selection interface and a body selection interface are provided for selecting a clothing or body transformation for transformation of the virtual fitting rendering image.

7. The device for virtual fitting according to claim 6, wherein request information for image transformation is received from the terminal of the user, the request information for image transformation includes coordinate information for transformation of clothing or body selection information, and the artificial intelligence server and the rendering server generate a virtual fitting transformation image using the selection information and the coordinate information for transformation.

8. A method for providing virtual fitting, comprising the steps of:

(a) receiving avatar 3D data of a user requesting virtual fitting, clothing 3D data of clothing selected by the user, and clothing material parameters for the selected clothing, and generating virtual fitting 3D data through neural network operations;

(b) rendering the virtual fitting 3D data using the virtual fitting 3D data and the clothing material parameters to generate a virtual fitting rendering image; and (c) transmitting pixel data of the virtual fitting rendering image to the user, wherein user-specific avatar 3D data, clothing-specific 3D data, and clothing-specific clothing material parameters are stored in a database, the clothing material parameters have a vector form including a plurality of scalar values, wherein the clothing material parameters are obtained through neural network operations of a material parameter determination neural network that outputs the clothing material parameters using 3D data of the corresponding clothing, and wherein, for learning of the material parameter determination neural network, a plurality of similar labels are prepared in advance, each of the plurality of similar labels is applied to a rendering engine to generate a rendered image of a specific clothing, the similar label with the highest similarity between the rendered image and a real image of the specific clothing is selected, and then a difference between the selected similar label and the clothing material parameters that the material parameter determination neural network outputs in response to receiving the clothing 3D data of the specific clothing is reflected as a loss, so that the material parameter determination neural network is trained.

9. The method for providing virtual fitting according to claim 8, wherein the material parameter determination neural network is trained by applying, to the rendering engine, the clothing material parameters that the material parameter determination neural network outputs in response to receiving the clothing 3D data of the specific clothing to the rendering engine, and reflecting a loss between an image rendered by the rendering engine in response to the applied clothing material parameters and the real image of the specific clothing.

10. The method for providing virtual fitting according to claim 8, wherein the step (a) is performed on an artificial intelligence server, and the artificial intelligence server is trained using physics-based losses.

11. The method for providing virtual fitting according to claim 10, wherein the physics-based losses include strain energy loss that utilizes a physical property of clothing to maintain its original shape, and bending energy loss that utilizes the physical property of minimizing bending of a face of the clothing 3D data.

12. The method for providing virtual fitting according to claim 11, wherein the physics-based losses further include collision loss to ensure that clothing 3D data does not exist inside avatar data.

13. The method for providing virtual fitting according to claim 8, wherein the virtual fitting rendering image is displayed on a terminal of the user, and a clothing selection interface and a body selection interface are provided for selecting a clothing or body transformation for transformation of the virtual fitting rendering image.

14. The method for providing virtual fitting according to claim 13, further comprising a step of:

receiving request information for image transformation from the terminal of the user, wherein the request information for image transformation includes coordinate information for transformation of clothing or body selection information, and to generate a virtual fitting transformation image, the steps (a) and (b) are performed using the above selection information and the coordinate information for the transformation to generate a virtual fitting transformation image.

* * * * *